United States Patent

[11] 3,587,623

[72] Inventor: Ivan L. Wilson
 Islington, Ontario, Canada
[21] Appl. No. 632,823
[22] Filed Apr. 21, 1967
 Division of Ser. No. 478,070, Aug. 9, 1965,
 Patent No. 3,375,162. Filed Apr. 21, 1967,
 Ser. No. 632,823
[45] Patented June 28, 1971
[73] Assignee Atomic Energy of Canada Limited
 Ottawa, Ontario, Canada

[54] PRESSURE RELIEF VALVE
 4 Claims, 7 Drawing Figs.
[52] U.S. Cl. .................................................. 137/246.22,
 137/312, 137/492, 137/529, 137/538, 277/59,
 277/72
[51] Int. Cl. ..................................................... F16k 19/00,
 F16k 25/02, F16k 23/00
[50] Field of Search .......................................... 137/146.22,
 492, 492.5, 529, 538; 251/172, 173, 175; 92/158,
 160, 174, 112 (Inquired); 277/59, 72

[56] References Cited
 UNITED STATES PATENTS
 2,188,105  1/1940  Caldwell .................... 92/112X
 2,741,262  4/1956  Crookston ................. 137/529X
 3,039,292  6/1962  Ottestad et al. ........... 137/538X
 3,292,732  12/1966  Webb ......................... 137/529X Primary Examiner—William F. O'Dea
Assistant Examiner—Richard Gerard
Attorney—Graham and Baker ABSTRACT: A pressure relief valve is described consisting of a cylinder and a piston, and in which one end of the cylinder communicates with a duct from which pressure is to be relieved. There are ports in the side of the cylinder, and the piston is constructed as a bobbin with upper and lower plates. The valve operates by movement of the piston in the cylinder so as to uncover the ports and connect the duct to the ports. The other end of the cylinder has provision for establishing a pressure therein which affects the movement of the piston.

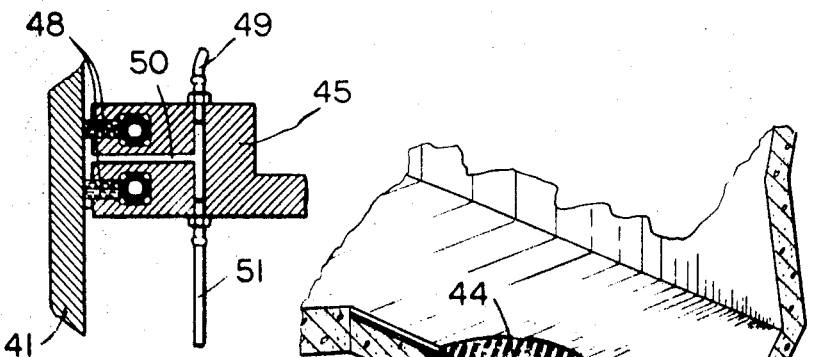
Fig. 5
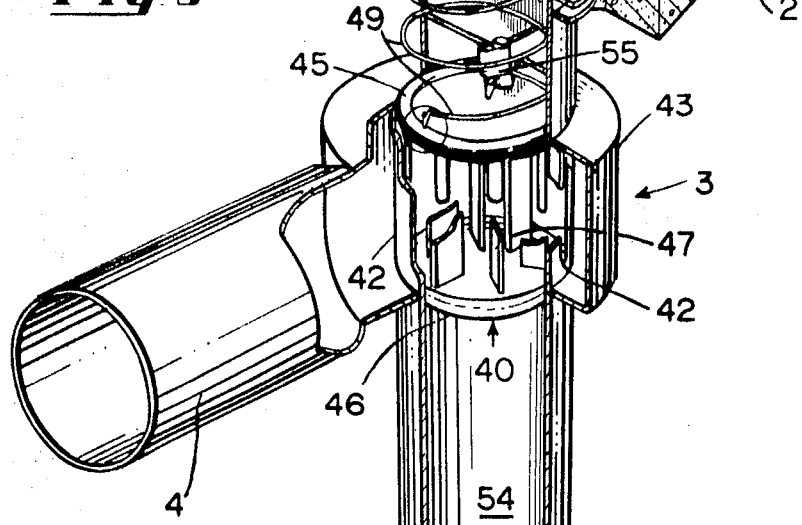
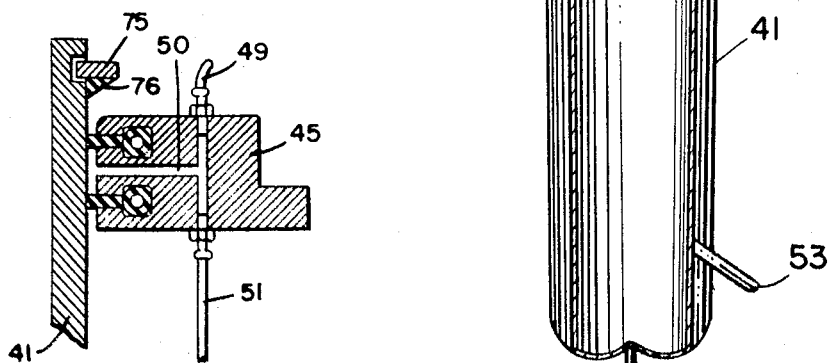
Fig. 7
Fig. 4

PRESSURE RELIEF VALVE

This application is a division of my U.S. application Ser. No. 478,070 filed Aug. 9, 1965, now U.S. Pat. No. 3,375,162.

This invention relates to a relief valve for use in conjunction with a containment system for nuclear reactors.

With the current development of nuclear reactors for power generation, and the increasing necessity of siting such reactors in areas of relatively high population density, it has become important to devise some way in which, in the event of accidental or catastrophic failure of the reactor, all radioactivity shall be prevented from escaping to the environment. One method of obtaining the containment has been to surround the reactor, and all associated equipment which could become radioactive, with a pressure shell which can withstand the overpressure likely to be developed in the event of the worst possible failure. Such shells have proved satisfactory where the power output of the reactor is relatively low, but in reactors which are now being designed, outputs of the order of 500 MWE are intended, and suitable pressure shells become impractical and very expensive to construct.

In such a high power reactor, for example, a catastrophic breakdown could lead to the release of about 400 million B.t.u. within the first hour following the start of the breakdown. The pressure developed in any containment volume will depend upon the amount of injection cooling provided after the breakdown. In the worst case where injection cooling is inoperative, all the heat being produced at the time of the accident and that generated in radioactive decay of the fuel after the reactor has been shut down must be contained. For example, a containment of $2\times10^6$ ft$^3$ would result in a pressure of 112 p.s.i. gauge. A volume of $5\times10^6$ ft$^3$ would give a pressure of 50 p.s.i.g. These pressures are very high and suitable containment would probably only be possible with a double wall structure. Such structures are exceedingly expensive, particularly as the leakage must be maintained at a very low FIG. Although it is possible to arrange a heat exchange system for the removal of heat after accidents, when large outputs are involved the cost of the heat absorption system (which must be provided for each reactor in a group) becomes embarrassingly high.

Other suggestions for containment have been made in which the enclosure for a reactor is vented through a heat exchanger to a gas holder. Even this arrangement is not perfect, because pressures within the containment vessel will be above atmospheric and leakage of radioactivity may occur. If such a gas holder system is analyzed, it is seen that the reactor enclosure must be designed to withstand quite a considerable pressure above atmospheric to cover the transient stage at the time of, and immediately following, the accident.

It is with the shortcomings of the prior art in mind that the present invention has been made, and in accordance with one aspect of the invention a negative pressure containment principle is envisaged in which a reactor is housed by a building in which the pressure is maintained at atmospheric, however the reactor building may be vented to a large vacuum building. If pressure between the two buildings is allowed to equalize the pressure in both remains below atmospheric. In this way radioactivity is prevented from escaping to the surroundings. Another aspect of the invention relates to a fast acting but simple relief valve for use with such structures.

The invention will now be described in more detail having reference to the accompanying drawings in which:

FIG. 4 is a perspective partly sectional view of a relief valve between vacuum building and reactor enclosure, FIG. 5 is an enlarged, partly section view of part of FIG. 4.

FIG. 7 shows the view of FIG. 5 modified to shown an axial seal.

Figure 1:
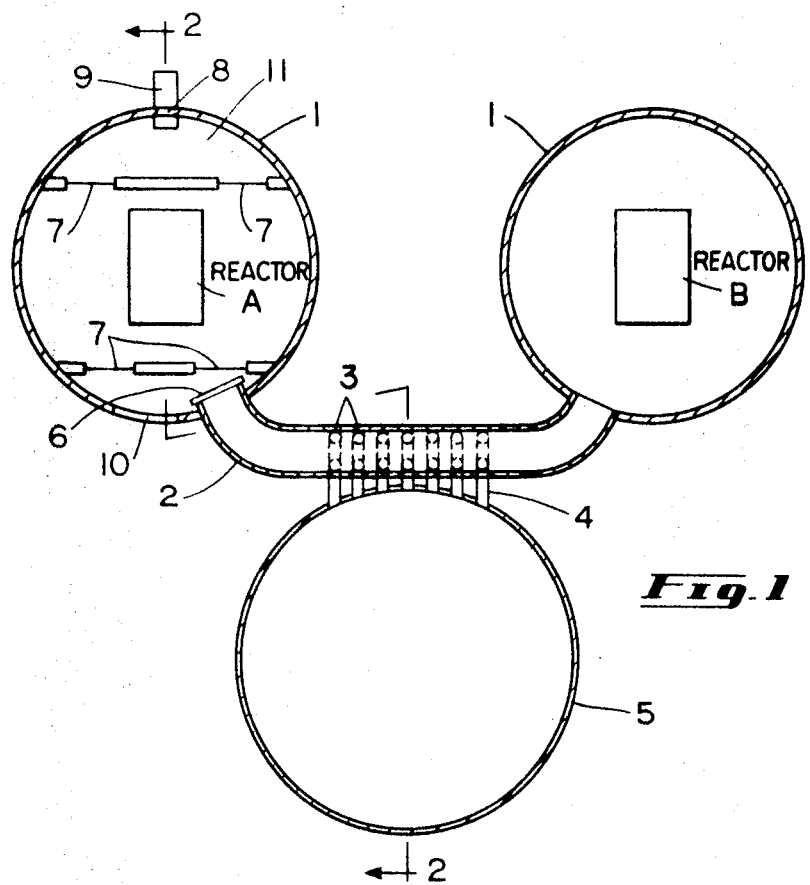
FIG. 1 shows a plan view of a system layout according to the invention.

Having reference to FIG. 1, the new system is shown in which two reactors A and B, are arranged in gastight enclosure buildings 1. Details are shown only for structure associated with Reactor A but that for B is similar. Each enclosure is connected with a duct 2 carrying a series of valves 3. The valves connect with pipes 4 which each lead into a vacuum building 5 in which a low pressure is maintained. In the event that an accident occurs in one of the reactors, a transient overpressure will be developed, thereby leading to opening of the valves 3 and drawing down the pressure in both reactor buildings.

Figure 2:
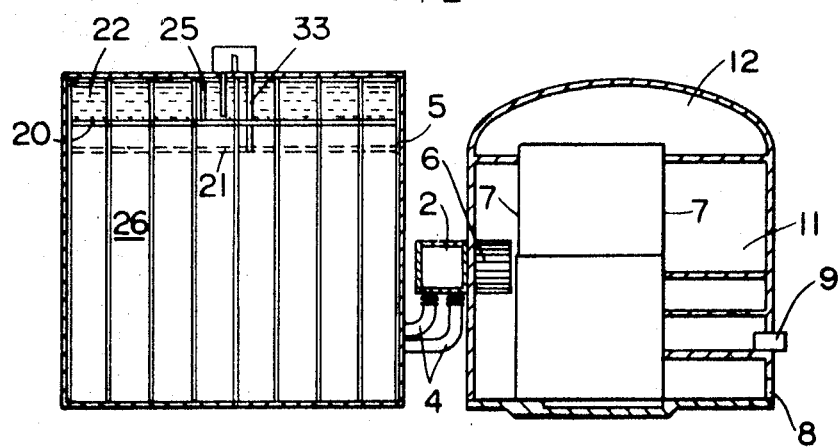
FIG. 2 is a side sectional elevation along line 2–2 of FIG. 1.

The spaces inside the enclosures 1 are interconnected by large passages and the gas contained in and released in both of the enclosures, passes through the louvres 6. Easily ruptured blow out curtains 7 which form a closed space for the reactors for normal operation may be included if desired. The buildings 1 housing the reactors include equipment entry doors 8, an air lock 9, and a breakout panel 10 which is useful for removing large pieces of equipment, such as the reactor calandria or dump-tank, if major servicing is required. Reference to FIG. 2 gives a general side view in section of the reactor building 1 and the vacuum building 5 of FIG. 1.

Figure 3:
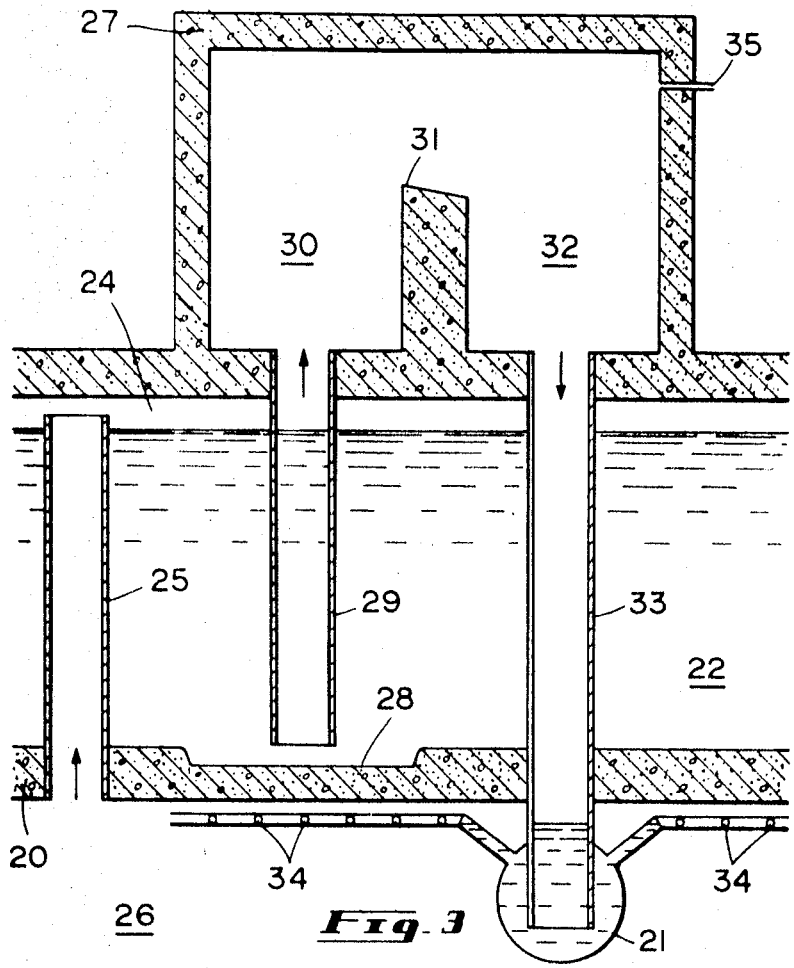
FIG. 3 is a side view in section of a spray system for the vacuum building of FIGS. 1 and 2.

In FIG. 2, a water spray cooling system for vacuum building 5 comprises a water retaining floor 20 and spray header 21. Water 22 is contained in the tank formed by the side of the building and the floor 20. Further details of the water storage and spray system can be seen in FIG. 3. The space 24 above the water is connected through a pipe 25 to the interior 26 of the vacuum building. When the pressure in space 24 rises above that maintained in closed compartment 27, the water from space 22 will flow from well 28, up pipe 29, into side 30 of compartment 27. When the pressure differential between 27 and 24 becomes great enough, the water will rise to and flow over the dam 31 into space 32 down pipe 33 and into header 21. From there it is distributed through spray feeders 34. The header forms a trap with pipe 33 to prevent any tendency for gas in building space 26 to travel back through the spray system and into compartment 27. In order for the spray system to function and for water to syphon from the reservoir, the space 27 is normally connected to a source of vacuum through port 35 which can change only slowly and is at a pressure essentially equal to that normally maintained (i.e. no accident condition), in building space 26. This pressure will be close to the vapor pressure of water at the temperature in building 5, with a small additional partial pressure of air, say, of 10—25 mm Hg. Water will be present in tube 29 and space 30 and the distance of its surface below the dam 31 will depend upon the differential in pressure between 26 and 27. If the distance below the dam is suitably chosen, small variations in pressure in space 26 will not cause the spray system to operate, but an appreciable change (dependent upon the vacuum at port 35 and the height of the dam 31), will activate the spray system to cool any gas or vapor within the space 26 in building 5. It is desirable that the spray not come into operation until the gases in or entering the vacuum building contain a reasonable proportion of water vapor which the spray can condense. Thus by choosing the height of the dam a predetermined delay can be arranged.

Details of an exemplified form for the valves 3 can be seen with reference to FIG. 4. Here a valve 3 comprises a piston 40 which slides in a cylinder 41, which cylinder includes discharge ports 42 leading into a plenum 43 connected with pipe 4. Air can pass to the upper part of the cylinder 41 through grille 44 from the duct 2. The piston consists of a spool made up of two end plates 45 and 46, held apart by struts 47. Each plate 45 is free to slide in the cylinder 41, but is sealed to it by piston rings 48, here shown as a pair of rings suitably of polytetrafluoroethylene (see FIG. 5). Oil can be injected into the space between the rings through pipe 49 where it passes into cavity 50 so that any leakage into pipe 4, and thence the vacuum building will be oil rather than air. The pipe 49 continues at 51 to feed a space similar to 50 in the lower end plate 46. Movement of the valve can be achieved by the application of pressure or vacuum to the port 53. In the normal closed position the pressure in duct 2 will essentially be atmospheric and only sufficient pressure will be required within space 54 in cylinder 41 to support the weight of the piston.

The valve 3 may open either automatically by virtue of the pressure in duct 2 against end plate 45 when it exceeds atmospheric (by suitable choice of steady pressure in chamber 54) or it may open under control of a differential pressure sensor cell which detects the pressure in the reactor building 1 with respect to the atmosphere and lowers the pressure in chamber 54 so that plate 46 moves downwards as soon as a chosen overpressure, say, 0.5 p.s.i.g. is present in building 1. In the first arrangement the valve will close again as soon as the pressure in duct 2 drops to atmospheric. In the second case the valve can either be closed again as soon as the pressure sensor detects atmospheric or a chosen lower pressure, say 0.25 p.s.i.g. in the building 1, or the valve may be left open so that the pressure in the vacuum and reactor buildings will equalize.

It is clear that by dropping the pressure in space 54 the valve can be opened at any time when required. A position sensor 55 detects the position of piston 40 and controls pilot valves (not shown) connected to port 53. (Grille 44 may be covered by a rubber mat at such time to prevent loss of vacuum in building 5). Alternatively a water trap (not shown) in the pipe 4 connected with the valve under test may be filled to prevent flow of air into the vacuum building. A drain pipe 57 is provided at the bottom of cylinder 41 for removing any oil leaking into space 54.

Figure 6:
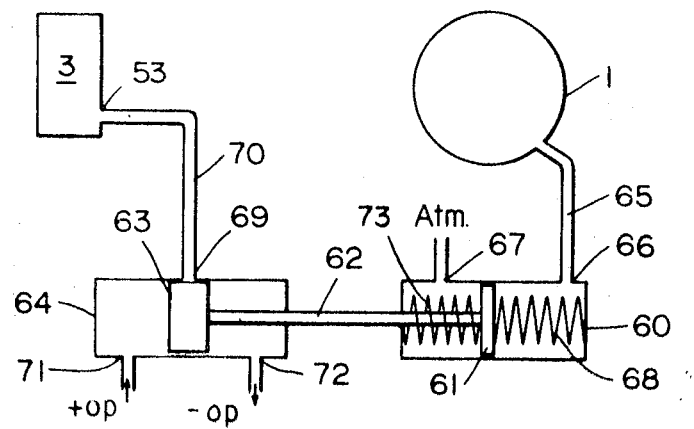
FIG. 6 shows a diagrammatic view of an operating system for a valve of FIG. 4.

Reference to FIG. 6 shows diagrammatically the use of a differential pressure sensor for operating valve 3. A cylinder 60 carries a piston 61 and connects through piston rod 62 to a piston 63 running in a second cylinder 64. A conduit 65 connects pressure in building 1 to a port 66 at one end of cylinder 60 and a port 67 vents the other end of cylinder 60 to atmosphere. Springs 68 and 73 resiliently oppose movement of piston 61 from the midpart of cylinder 60. Cylinder 64 is connected from a port 69 at its midpart through conduit 70 to port 53 of valve 3. Gas can be led into the cylinder 64 at port 71 at a small pressure above atmospheric, and can be removed at a small subatmospheric pressure from port 72.

It can now be seen that when the pressure in building 1 exceeds atmospheric by an amount sufficient to move piston 63 beyond port 69, gas will be withdrawn from conduit 70 and valve 3 can open itself. When the pressure in building 1 drops below atmospheric sufficiently to move piston 61 so that ports 71 and 69 are connected, gas will pass to port 53 and allow the valve to close. By choice of the strength of springs 68 and 73, the pressure in building 1 at which the valve 3 opens and closes can be selected.

While a particular form of valve has been disclosed in FIGS. 4 and 5, the piston could merely act against a spring instead of the cushion of air (when used as a self operating relief valve). One advantage of the air cushion type of relief valve over that in which the piston acts against the spring however is that the valve can be moved under test by adjusting the air pressure in the cushion chamber 54. In another version of the valve in FIG. 7 the sealing rings 48 may be modified so that the top plate 45 seals axially against a stationary ring 75 mounted in the cylinder. The seal is made of a soft material 76 which may be mounted either on the piston or the stationary ring as shown. The bottom piston rings on end plate 46 can also conveniently be replaced by a dry gas-holder-type of flexible diaphragm seal which allows a considerable length of stroke without leakage.

Conventional butterfly valves may be used instead of the valve describe with reference to FIGS. 4 and 5, however the operators required to give the necessary rapid response are very large, and the valves are thus dependent upon these operators rather than being self moving.

Some considerations are necessary in determining the size of the vacuum building required for the number of reactor buildings connected to it. It is desirable to operate the reactor buildings at a very slight negative pressure, say about 1 or 2 inches of water, and to arrange that the pressure relief valves 3 start to open as soon as a positive pressure of about 0.5 p.s.i.g. is developed in any one of the reactor buildings. With the 500 MWE reactors considered, the vacuum building should typically be $2.6 \times 10^6$ ft$^3$ for each reactor building of $1.2 \times 10^6$ ft$^3$ connected to it. This will contain all the air which could be purged from the reactor building in the event of an accident, plus about $10^6$ ft$^3$ of steam with an allowance for expansion due to heating. The vacuum building would thus contain all the steam to be produced by the discharge of the entire primary coolant without the need for dousing or coolant injection. The spray cooling described earlier would however be arranged automatically to come into effect at a pressure determined by the dimensions of the system and typically at about 5 p.s.i. absolute in the vacuum building. The reservoir 22 would hold about $4 \times 10^5$ ft$^3$ of room temperature water. Deferring the on set of the spray avoids wastage of water during the period when the discharge into the vacuum building might e mostly air and hence noncondensible. The water spray will cool the air and quench any vapor which is present thereby reducing the volume of gases and assisting the assembly of vacuum and reactor buildings to contain all radioactivity below atmospheric pressure. The feed system to, and, the spray nozzles 34 are preferably chosen in size so that the reservoir will be completely emptied by the time the pressure in the vacuum building has equalized with that in the reactor buildings.

I claim:

1. A pressure relief valve for connecting a gas duct to a vacuum pipe, said valve comprising a cylinder, ports in said cylinder leading to the vacuum pipe, said gas duct being joined to one end of the cylinder adjacent said ports, a piston in said cylinder comprising a bobbin including a first and a second end plate, said first end plate being adjacent the one end of the cylinder and separating said one end from said ports, the second plate being beyond said ports, a pair of piston ring sealing means between the first plate and the cylinder and defining a clearance space between said rings, further piston ring sealing means between the second plate and said cylinder and defining a second clearance space there between liquid conduit means between said first and said second clearance spaces, and flexible conduit means attached to one plate of the bobbin and movable with said bobbin for leading sealing liquid into one of said spaces, and pipe means in communication with a control gas and the part of said cylinder defined beyond said second plate, said piston being positioned in dependence upon pressure in said gas duct and in said part of the cylinder.

2. Apparatus as defined in claim 1 comprising a differential pressure sensor sensitive to pressure in said gas duct and means for withdrawing gas from the said part of said cylinder through said pipe operatively means connected to said differential pressure sensor for opening said relief valve when pressure in said duct reaches a chosen value.

3. Apparatus as defined in claim 1, a sealing ring mounted in the one end of said cylinder, the first mentioned sealing means being compressed between said ring and said piston for sealing said duct from said ports upon axial movement of said piston against said ring.

4. Apparatus as defined in claim 1, said valve being oriented with said part of said cylinder lowermost and comprising a liquid drain pipe in the said part of said cylinder for removing liquid leaking from said clearance spaces.